(12) United States Patent
Farmer

(10) Patent No.: US 6,577,936 B2
(45) Date of Patent: Jun. 10, 2003

(54) IMAGE PROCESSING SYSTEM FOR ESTIMATING THE ENERGY TRANSFER OF AN OCCUPANT INTO AN AIRBAG

(75) Inventor: Michael Edward Farmer, West Bloomfield, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/006,564

(22) Filed: Nov. 5, 2001

(65) Prior Publication Data

US 2003/0033066 A1 Feb. 13, 2003

Related U.S. Application Data

(63) Continuation-in-part of application No. 09/901,805, filed on Jul. 10, 2001.

(51) Int. Cl.$^7$ ................................................. G06F 7/00
(52) U.S. Cl. ........................... 701/45; 701/28; 180/271
(58) Field of Search ............................. 701/45, 47, 28; 180/268, 271; 280/735; 382/103, 104, 106; 340/438

(56) References Cited

U.S. PATENT DOCUMENTS

| | | |
|---|---|---|
| 4,179,696 A | 12/1979 | Quesinberry et al. |
| 4,625,329 A | 11/1986 | Ishikawa et al. |
| 4,985,835 A | 1/1991 | Sterler et al. |
| 5,051,751 A | 9/1991 | Gray |
| 5,074,583 A | 12/1991 | Fujita et al. |
| 5,229,943 A | 7/1993 | Eigler et al. |
| 5,256,904 A | 10/1993 | Tohbaru |
| 5,366,241 A | 11/1994 | Kithil |
| 5,398,185 A | 3/1995 | Omura |
| 5,413,378 A | 5/1995 | Steffens, Jr. et al. |
| 5,446,661 A | 8/1995 | Gioutsos et al. |
| 5,490,069 A | 2/1996 | Gioutsos et al. |
| 5,890,085 A | 3/1999 | Corrado et al. |
| 5,983,147 A | 11/1999 | Krumm |
| 6,005,958 A | 12/1999 | Farmer et al. |
| 6,018,693 A | 1/2000 | Blackburn et al. |
| 6,026,340 A | 2/2000 | Corrado et al. |
| 6,198,998 B1 * | 3/2001 | Farmer et al. ................. 701/45 |
| 6,272,411 B1 | 8/2001 | Corrado et al. |

* cited by examiner

Primary Examiner—Gertrude Arthur
(74) Attorney, Agent, or Firm—Rader, Fishman & Grauer PLLC

(57) ABSTRACT

The present invention relates in general to systems used to determine whether an airbag should be deployed at full or only partial strength. In particular, the present invention is an image processing system that utilizes real-time streaming video-images from a video camera or other sensor to determine the mass, velocity, and kinetic energy of the occupant at the time that the occupant comes into contact with the deploying airbag. By predicting the kinetic energy of the occupant at the time of impact, an airbag can be deployed at an appropriate strength corresponding to the kinetic energy of the occupant. The kinetic energy of the deploying back at the moment of impact should be equal to the kinetic energy of the occupant. The invention captures the volume of the occupant from an image, and uses volume to calculate the mass of the occupant. A Kalman filter is used with respect to all measurements to incorporate past predictions and measurements into the most recent estimates and predictions in order to eliminate the "noise" associated with any particular measurement. The system predicts the position and shape of the occupant at a faster rate than the rate at which the camera collects data.

26 Claims, 6 Drawing Sheets

| Major | Minor | Width |
|-------|-------|-------|
| Input | Input | Output |
| Input | Input | Output |
| Input | Input | Output |
| Input | Input | Output |
| Input | Input | Output |

Fig. 11a

| Major | Minor | Volume |
|-------|-------|--------|
| Input | Input | Output |
| Input | Input | Output |
| Input | Input | Output |
| Input | Input | Output |
| Input | Input | Output |

Fig. 11b

| Major | Minor | Mass |
|-------|-------|------|
| Input | Input | Output |
| Input | Input | Output |
| Input | Input | Output |
| Input | Input | Output |
| Input | Input | Output |

IMAGE PROCESSING SYSTEM FOR ESTIMATING THE ENERGY TRANSFER OF AN OCCUPANT INTO AN AIRBAG

RELATED APPLICATIONS

This Continuation-In-Part application claims the benefit of the U.S. utility application titled "IMAGE PROCESSING SYSTEM FOR DYNAMIC SUPPRESSION OF AIRBAGS USING MULTIPLE MODEL LIKELIHOODS TO INfER THREE DIMENSIONAL INFORMATION," Ser. No. 09/901,805, filed on Jul. 10, 2001, the contents of which are hereby by incorporated by reference in their entirety.

BACKGROUND OF THE INVENTION

The present invention relates in general to systems or methods used to determine whether the deployment of an airbag should be either fully or partially impeded. In particular, the present invention is an image processing system that receives a stream of two-dimensional images and applies iterative and probability-weighted processes to infer three-dimensional characteristics to those images, which in turn are used to determine the magnitude of the impact between an occupant and an airbag.

Conventional airbag deployment systems have contributed significantly to the safety of occupants in automobile crashes. However, there may be occasions when the full strength deployment of an airbag may not be desirable. The purpose of a airbag is to absorb the impact of an occupant. Airbag deployment strength in excess of this purpose may not be desirable.

Prior art systems generally take an all or nothing approach. Under such approaches, an airbag is either fully disabled or is deployed at full strength. A total disablement of the airbag precludes the occupant from receiving any benefits of an airbag, a generally useful safety device. A full strength deployment of an airbag may subject the occupant to undesirable force in a low speed crash. It would be desirable if an airbag deployment system could be deployed at various different strengths depending on the impact of the occupant and the airbag. It would be desirable if metrics such as kinetic energy, momentum, or other measurements utilizing the characteristics of mass and velocity were used to determine the magnitude of impact that an airbag needs to absorb from the impacting occupant. Current methods for determining the velocity and mass of an occupant suffer from significant limitations in the existing art.

Weight-based systems typically use weight sensors to determine the weight of an occupant. Weight-based systems are vulnerable to inaccurate measurements because of rapidly changing movements of an automobile in a state of crashing. Such movements can cause the weight in a seat to shift, making it difficult to measure weight accurately. Weight-based systems also lack the ability to track the speed at which the occupant approaches the airbag during a crash or during pre-crash braking. It would be desirable if the weight of an occupant were measured by more reliable means, such as by an analysis of the visual image of the occupant. Because the weight density for the otherwise diverse range of human occupants is relatively constant, it would be desirable to use the volume of an occupant to determine the mass of the occupant. It would also be desirable for the velocity of the occupant to be measured or calculated.

The current art also suffers from problems relating to the determination of velocity. Velocity-based systems often require highly expensive cameras. Timing is critical to any system used to modify airbag deployment. A standard video camera operates at a frequency between 50–100 hz and captures between 50 to 100 image frames per second of operation. Effective airbag determinations require more frequent updates, around approximately 200 updates per second (200 hz). Moreover, it would be desirable for an image processing system to predict the occupant's velocity at the time of impact with the airbag rather than merely identifying the occupant's velocity at the time that the image is captured. It would be desirable for such a system to track the acceleration and location of the occupant. It would also be desirable if accurate predictions could be generated at a faster rate than the camera speed so that a less expansive standard video camera could be used instead of a more expensive highly specialized high-speed camera.

Prior art systems are susceptible to "noise" because prior art systems focus solely on the most recent measurement or image, and ignore the series of measurements or images captured mere fractions of a second earlier. Measurement "noise" results from several factors, including the inherent imperfections of the segmentation process. The segmentation process is the process of extracting a segmented image (an image of just the occupant in isolation of the surrounding area) from the ambient image, which includes the image of the occupant as well as the surrounding area. It would be desirable for an image processing system to utilize an iterative process that would integrate the information contained in the most recent image into a comprehensive framework that includes prior predictions and indirectly, the prior images used to make those prior predictions. It would also be desirable for all predictions to be probability-weighted predictions. It would also be desirable for such weighted predictions to incorporate probabilities associated with predefined occupant states such as leaning left towards the driver, leaning right away from the driver, or sitting upright, and predefined occupant modes such as crash, stationary, or human.

Camera-based prior art systems also limited by the fact that they rely on two-dimensional images. The images captured by cameras, including video cameras, are inherently two dimensional images. However, some important characteristics such as volume are three dimensional. Thus, it would be highly beneficial if three-dimensional information could be inferred from a series of two-dimensional images taken by a single standard video camera. Moreover, it would be helpful if predefined occupant states were incorporated into the iterative process of deriving a three-dimensional information from a series of two-dimensional images.

SUMMARY OF THE INVENTION

This invention relates to an image processing system used to determine the strength at which an airbag should be deployed. In particular, this invention relates to an image processing system used to determine the impact of the occupant that the deploying airbag needs to absorb.

The invention determines the kinetic energy, momentum, or some other metric for measuring the impact of the occupant, from an image of the occupant. The impact measuring metric can then be used by the airbag deployment system to determine the desirable strength for airbag deployment. For example, the impact metric may indicate that an airbag should only be deployed at 100%, 75%, 50%, or even only 25% strength. The impact metric could also determine that an airbag should not deploy at all (a 0% strength deployment).

Through the use of sensor readings, the invention calculates one or more impact metrics. In a preferred embodiment of the invention, kinetic energy is the impact measurement. Kinetic energy is calculated using the mass and velocity of the occupant. Mass can be calculated using the volume of an occupant. Velocity of an occupant can be determined by comparing the change in occupant position.

In a preferred embodiment of the invention, two iterative and interactive multiple model Kalman filters can be used to incorporate a series of measurements relating to the most recently captured image of the occupant into an ongoing series of past predictions and image measurements relating to the position (including position, velocity, and acceleration) and shape (including area and volume) of the occupant.

Various aspects of this invention will become apparent to those skilled in the art from the following detailed description of the preferred embodiment, when read in light of the accompanying drawings.

BRIEF DESCRIPTION OF THE DRAWINGS

FIG. 11a shows a "look-up" table where the width of the upper ellipse is determined by using the major axis and minor axis of the upper ellipse as inputs.

FIG. 11b shows a "look-up" table where the volume of the upper ellipse is determined by using the major axis and minor axis of the upper ellipse as inputs.

FIG. 11c shows a "look-up" table where the mass of the upper ellipse is determined by using the major axis and minor axis of the upper ellipse as inputs.

DETAILED DESCRIPTION OF THE PREFERRED EMBODIMENT

A. Partial View of Surrounding Environment

Figure 1:
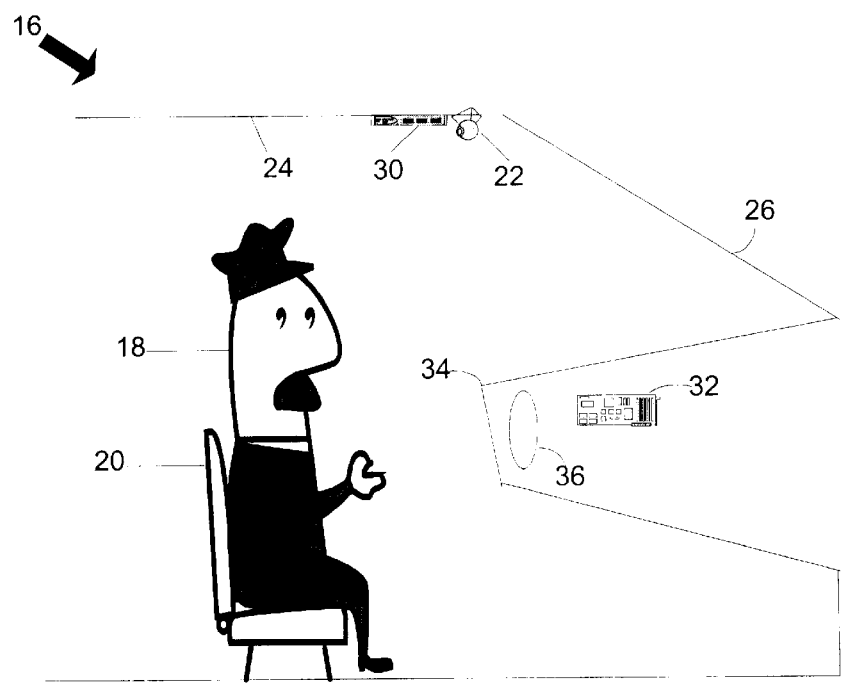
FIG. 1 shows a partial view of the surrounding environment for one potential embodiment of the invention.

Referring now to the drawings, illustrated in FIG. 1 is a partial view of the surrounding environment for one potential embodiment of the invention, an image processing system 16. If an occupant 18 is present, the occupant 18 sits on a seat 20. In the preferred embodiment, a camera or other sensor 22 (collectively "camera") capable of rapidly capturing a series of images is attached in a roof liner 24, above the occupant 18 and in a position closer to a front windshield 26 than the occupant 18. The camera 22 should be placed in a slightly downward angle towards the occupant 18 in order to capture changes in the angle of the occupant's 18 upper torso resulting from forward or backward movement in the seat 20. There are many potential locations for a camera 22 that are well known in the art. Similarly, a computer 30 could be located virtually anywhere on a vehicle. In a preferred embodiment, the computer 30 is located near the camera 22 to avoid sending camera images through long wires. An airbag controller 32 is shown in an instrument panel 34, although the airbag controller could be located virtually anywhere in the vehicle. An airbag deployment system 36 is shown in the instrument panel 34 in front of the occupant 18 and the seat 20, although the system 16 can function with the airbag deployment system 36 in alternative locations.

B. High Level Process Flow

Figure 2:
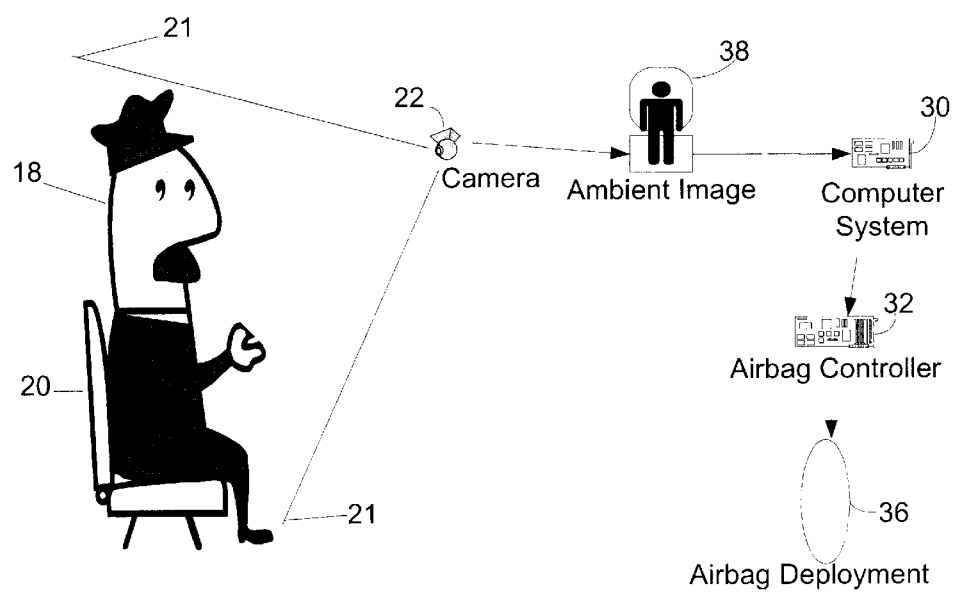
FIG. 2 shows a high-level process flow of the image processing system.

FIG. 2 discloses a very basic and high-level process flow relating to the use of the image processing system 16. An ambient image 38 of a seat area 21 includes both the occupant 18 and the surrounding seat area 21. In contrast to the ambient image 38 is a segmented image, which includes only the image of the occupant 18 in isolation from the surrounding seat area 21.

The ambient image 38 is captured by the camera 22 or any other sensor capable of rapidly capturing a series of images. In the Figure, the seat area 21 includes the entire occupant, although under some circumstances and embodiments, only a portion of the occupant's 18 image will be captured, particularly if the camera 22 is positioned in a location where the lower extremities may not be viewable. The ambient image 38 is sent to the computer 30.

As described in greater detail below, the system 16 derives a segmented image from the ambient image 38. The system 16 captures a series of measurements and performs a series of calculations to determine the magnitude of an impact metric between the occupant 18 and the airbag that will need to be absorbed at the time of impact.

In the preferred embodiment, the impact metric used by the system 16 is the kinetic energy of the occupant 18. In alternative embodiments, the momentum of the occupant 18, a weighted combination of kinetic energy or momentum, or any other heuristic or combination of heuristics utilizing mass and velocity can be used as the impact metric. The impact metric is sent to the airbag controller 32 which in turn controls the airbag deployment system 36. The airbag deployment system 32 uses the impact metric to determine the impact of the occupant 18 that needs to be absorbed by the airbag. The airbag controller 32 can then cause the airbag deployment system 36 to deploy the airbag at the appropriate strength, such as 100%, 75%, 50%, 25%, or even 0% (no deployment at all).

C. Computer System Process Flow

Figure 3:
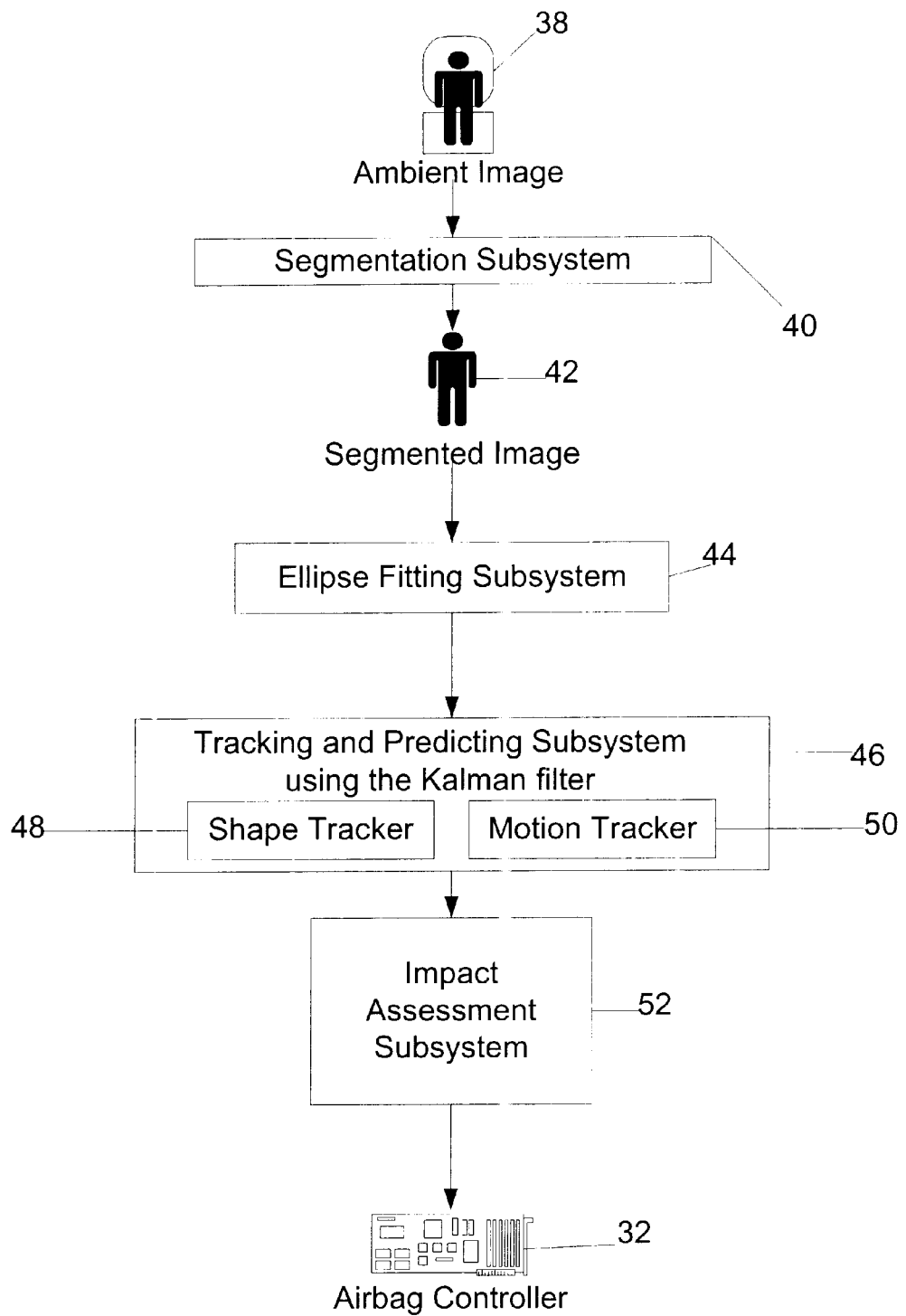
FIG. 3 shows a high-level block diagram of an image processing system.

FIG. 3 gives a high level process flow as to the processing performed by the computer 30 in the various embodiments of the system 16. In a preferred embodiment, the ambient image 38 of the occupant 18 and surrounding seat area 21 is inputted to the computer 30. A segmentation subsystem 40 extracts a segmented image 42 of the occupant, an image which includes only the occupant and not the surrounding seat area 21, from the ambient image 38. Various segmentation processes 40 are well known under existing art. Segmentation 40 is accomplished electronically through the use of software, and thus in alternative embodiments of the invention, segmentation could be performed in a computer that is separate from the computer at 30.

The segmented image 42 of the occupant 18 is then processed by an ellipse fitting subsystem 44. An upper ellipse is fitted around the upper torso of the occupant 18. The upper torso includes everything from the head of the occupant 18 down to the hips of the occupant 18. A lower ellipse is fitted from the toes of the occupant 18 up to the hips of the occupant. Both ellipses overlap at one point which is referred to as the centroid. The output of the ellipse fitting routine 44 will be discussed in greater detail below along with the discussion relating to FIGS. 4, 5, and 6. The processes and practices of generating an upper ellipse, a lower ellipse, and a centroid to represent different parts of the occupant 18 are known in the art. In a preferred embodiment of the invention, the ellipse fitting routine 44 is applied by the computer at 30, but in alternative embodiments, the ellipse fitting subsystem 44 could be performed by a computer that is separate from but connected to the computer at 30. Alternative embodiments could also utilize a different geometric shape than an ellipse, such as a rectangle, circle, or other geometric shape.

Information relating to the upper ellipse, lower ellipse, and centroid are then sent to a tracking and predicting subsystem 46. The tracking and predicting subsystem 46 applies distinct sub-processes simultaneously with each other. A shape tracker 48 tracks variables relating to the "shape" of the upper ellipse. This process is described in greater detail below in the discussion relating to FIG. 9. A motion tracker 50 tracks variables relating to the "motion" of the upper ellipse, specifically with respect the horizontal distance between the occupant 18 and the airbag deployment system 36 in the instrument panel 34. This process is described in greater detail below in the discussion relating to FIG. 10.

The computer system 30 uses the tracking and predicting subsystem 46 to track and predict the position, velocity, and acceleration of certain key measurements relating to shape and motion of the upper torso of the occupant 18 using a multiple model and iterative process. This iterative process incorporates the latest measurement into a series of ongoing measurements and predictions. In a preferred embodiment, the tracking and predicting subsystem 46 incorporates what is known in the prior art as a Kalman filter. A Kalman filter is very powerful in that it incorporates past predictions and measurements in a weighted fashion, supports estimations of past, present, and even future states. A Kalman filter can be used effectively even when the precise nature of the modeled system is unknown.

An academic paper entitled "An Introduction to the Kalman Filter" by Greg Welch and Gary Bishop is attached and incorporated by reference. The general equation for the Kalman filter is shown in Equation 1:

$$X_{(new\ prediction)} = X_{(old\ prediction)} + \text{Gain}[-X_{(old\ prediction)} + X_{(measured)}]$$

In a Kalman filter, "Gain" represents the perceived accuracy of the most recent measurement. A Gain of 0 indicates such a poor measurement that it is of no value, and thus the new estimate $X_{(new\ estimate)}$ is simply the value of the old estimate $X_{(old\ estimate)}$.

$$X_{(new\ estimate)} = X_{(old\ estimate)} + 0[-X_{(old\ estimate)} + X_{(measured)}]$$

$$X_{(new\ estimate)} = X_{(old\ estimate)} + 0$$

$$X_{(new\ estimate)} = X_{(old\ estimate)} \qquad \text{Equation 2}$$

A Gain of 1 indicates such confidence in the most recent measurement $X_{(measured)}$ that the new prediction $X_{(new\ estimate)}$ is simply the value of the most recent measurement $X_{(measured)}$.

$$X_{(new\ estimate)} = X_{(old\ estimate)} + 1[-X_{(old\ estimate)} + X_{(measured)}]$$

$$X_{(new\ estimate)} = X_{(old\ estimate)} - X_{(old\ estimate)} + X_{(measured)}]$$

$$X_{(new\ estimate)} = X_{(measured)} \qquad \text{Equation 3}$$

In a real world application, the Gain is virtually always greater than 0 and less than 1. The Gain thus determines to what degree a new measurement can change the previous aggregate estimate or prediction of the location of an object, in the case of the instant invention, the occupant 18 is the object being tracked. Both the shape tracker 48 and the motion tracker 50 are described in greater detail below, along with FIGS. 9 and 10 respectively.

The output from both the shape tracker 48 and the motion tracker 50 are used impact assessment subsystem at 52. In the preferred embodiment of the invention, the system 16 predicts the kinetic energy of the occupant 18 at the time that the airbag deployment system 36 deploys the airbag. Kinetic energy is a function of both mass and velocity.

$$\text{Kinetic Energy} = \tfrac{1}{2} * \text{Mass} * \text{Velocity}^2 \qquad \text{Equation 4}$$

As described in greater detail below, mass of the occupant 18 is calculated by using the volume of the occupant 18 and the density of the occupant 18.

$$\text{Mass} = \text{Volume} * \text{Density} \qquad \text{Equation 5}$$

The impact metric calculations are computed more frequently than the camera 22 can collect sensor readings. The impact assessment subsystem 52 is discussed in greater detail below.

The impact metric is sent by the impact assessment subsystem 52 to the airbag controller 32 so that the airbag controller 32 can communicate the appropriate deployment strength to the airbag deployment system 36.

D. Ellipse Fitting Subsystem

Figure 4:
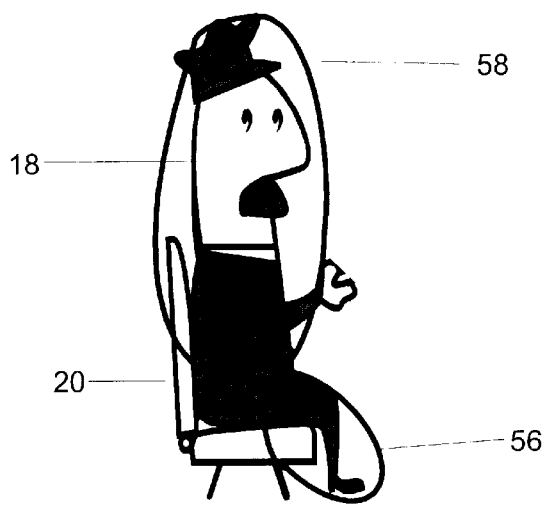
FIG. 4 shows the results of an ellipse fitting routing as performed by the ellipse fitting subsystem.

FIG. 4 illustrates the ellipse fitting routine implemented by the ellipse fitting subsystem 44. In a preferred embodiment, the ellipse fitting subsystem 44 is software in the computer 30, but in alternative embodiments, the ellipse fitting subsystem 44 could be housed in a different computer or device.

The upper ellipse 58 extends from the hips up to the head of the occupant 18. The lower ellipse 56, extends down from the hips to include the feet of the occupant 18. If the entire area from an occupant's 18 hips down to the occupant's 18 feet is not visible, a lower ellipse is generated to represent what is visible. An ellipse can be tracked by the system 16 using a single point on the ellipse, preferably the centroid of the ellipse. In alternative embodiments, shapes other than ellipses can be used to represent the upper and lower parts of an occupant 18. The ellipse fitting routine is known in the art. A preferred embodiment of the image processing system 16 does not utilize the lower ellipse 56.

Figure 5:
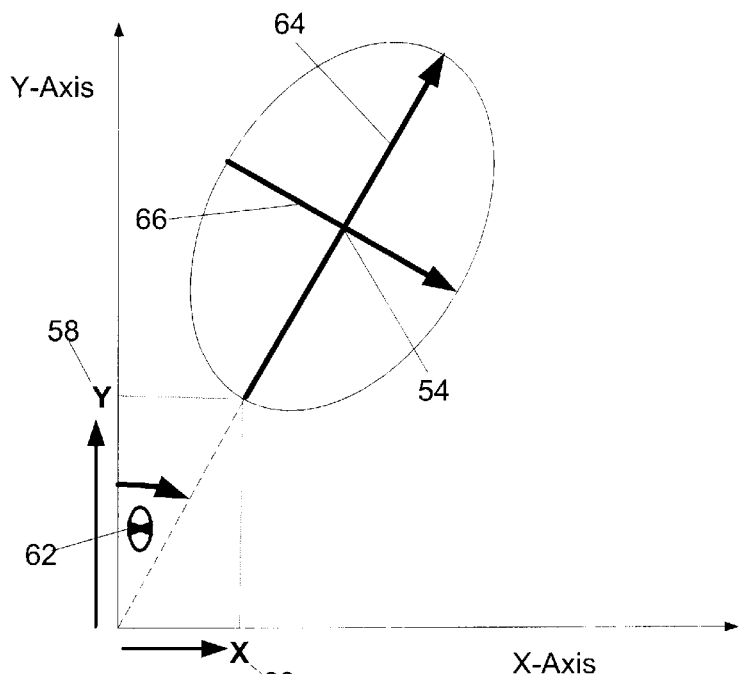
FIG. 5 shows an upper torso ellipse with all corresponding shape variables and motion variables (excluding velocity and acceleration derivations).

FIG. 5 illustrates many of the characteristics that can be outputted from the ellipse fitting subsystem 44 for use by the system 16. A centroid 54 of the upper ellipse can be identified by the system 16 for tracking characteristics of the occupant 18. It is known in the art how to identify the centroid 54 of an ellipse. Motion characteristics include the x-coordinate ("distance") 60 of the centroid 54 and a forward tilt angle ("θ") 62. Shape measurements include the y-coordinate ("height") 58 of the centroid 54, the length of the major axis of the ellipse ("major") 64 and the length of the minor axis of the ellipse ("minor") 66. Rate of change information, such as velocity and acceleration, are also captured for all shape and motion measurements, so in the preferred embodiment of the invention there are nine shape characteristics (height, height', height", major, major', major", minor, minor', and minor") and six motion characteristics (distance, distance', distance", θ,θ', and θ"). The sideways tilt angle Φ is not shown because it is perpendicular to the image plane, and this the sideways title angle Φ is derived, not measured, as discussed in greater detail below. Motion and shape characteristics are used to calculate the volume, and ultimately the mass, of the occupant 18, so that the kinetic energy of the occupant 18 can be determined.

Figure 6:
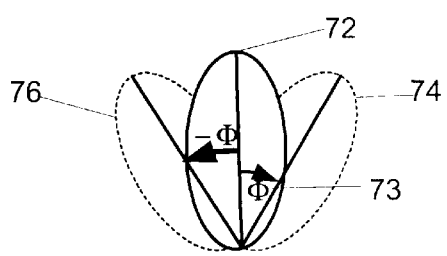
FIG. 6 shows three potential shape states and three potential sideways tilt angles.

FIG. 6 illustrates the sideways tilt angle "(Φ") 73. In the preferred embodiment of the invention, there are only three shape states, leaning left towards the driver (left) 76, sitting upright (center) 72, and leaning right away from the driver (right) 74, with tilt sideways tilt angles of −Φ, 0, and Φ. In a preferred embodiment, Φ is set at a value between 15 and 40 degrees, depending on the nature of the vehicle being used.

E. Markov Probability Chains

The present invention is directed to a multiple-model probability weighted implementation of a first Kalman filter for all shape characteristics and a second Kalman filter for all motion characteristics. In a preferred embodiment, each shape characteristic has a separate Kalman filter equation for each shape state. Similarly, each motion characteristic has a separate Kalman filter equation for each motion mode. In a preferred embodiment of the invention, the occupant 18 has at least one shape state and at least one motion mode. There are certain predefined probabilities associated with a transition from one state to another state. These probabilities can best be illustrated through the use of Markov chains.

Figure 7:
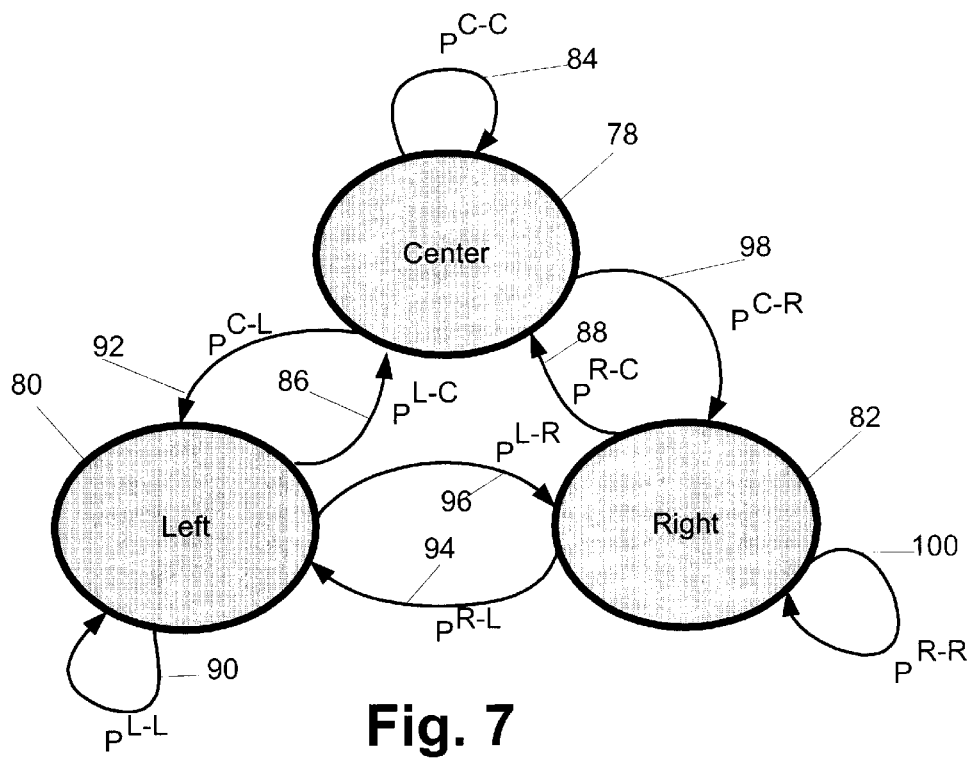
FIG. 7 shows a markov chain of probabilities relating to a three shape state embodiment including left, right, and center states.

FIG. 7 illustrates the three shape states used in the preferred embodiment of the invention. In the preferred embodiment, an occupant 18 is either leaning towards the driver ("left") 80, sitting upright ("center") 78, or leaning away from the driver ("right") 82. The probability of an occupant being in a particular state and then ending in a particular state can be identified by lines originating at a particular shape state with arrows pointing towards the subsequent shape state. For example, the probability of an occupant in center state remaining in center state $P^{C-C}$ is represented by the arrow at 84. The probability of moving from center to left $P^{C-L}$ is represented by the arrow 92 and the probability of moving from center to right $P^{C-R}$ is 98. The total probabilities resulting from an initial state of center 78 must add up to 1.

$$P^{C-C}+P^{C-L}+P^{C-R}=1.0 \qquad \text{Equation 6}$$

Furthermore, all of the probabilities originating from any particular state must also add up to 1.0.

The arrow at 86 represents the probability that a left tilting occupant 18 will sit centered $P^{L-C}$, by the next interval of time. Similarly, the arrow at 96 represents the probability that a left tilting occupant will tilt right $P^{L-R}$ by the next interval of time, and the arrow at 90 represents the probability that a left tilting occupant will remain tilting to the left $P^{L-L}$. The sum of all possible probabilities originating from an initial tilt state of left must equal 1.

$$P^{L-C}+P^{L-L}+P^{L-R}=1.0 \qquad \text{Equation 7}$$

Lastly, the arrow at 100 represents the probability that a right tilting occupant will remain tilting to the right $P^{R-R}$, the arrow at 88 represents the probability that a right tilting occupant will enter a centered state $P^{R-C}$, and the arrow at 94 represents the probability that an occupant will tilt towards the left $p^{R-L}$ The sum of all possible probabilities originating from an initial tilt state of right equals 1.

$$P^{R-C}+P^{R-L}+P^{R-R}=1.0 \qquad \text{Equation 8}$$

As a practical matter, the typical video camera 22 used in the preferred embodiment captures between 50 to 100 frames each second. Thus, it is essentially impossible for a left 80 leaning occupant to become a right 82 leaning occupant, or for a right 82 leaning occupant to become a left 80 leaning occupant, in a mere 1/50 of a second. It is far more likely that a left 80 leaning occupant will first enter a center state 78 before becoming a right 82 leaning occupant, and similarly, it is far more realistic for a left 80 leaning occupant to become a centered 78 occupant before becoming a right 82 leaning occupant. Thus, in the preferred embodiment of, $P^{L-R}$ at 96 is always set at zero and $p^{R-L}$ at 94 will also always be set at zero. The three probability equations relating to shape state are thus as follows:

$$P^{C-C}+P^{C-L}+P^{C-R}=1.0 \qquad \text{Equation 9}$$

$$P^{R-C}+P^{R-R}=1.0 \qquad \text{Equation 10}$$

$$P^{L-C}+P^{L-L}=1.0 \qquad \text{Equation 11}$$

Figure 8:
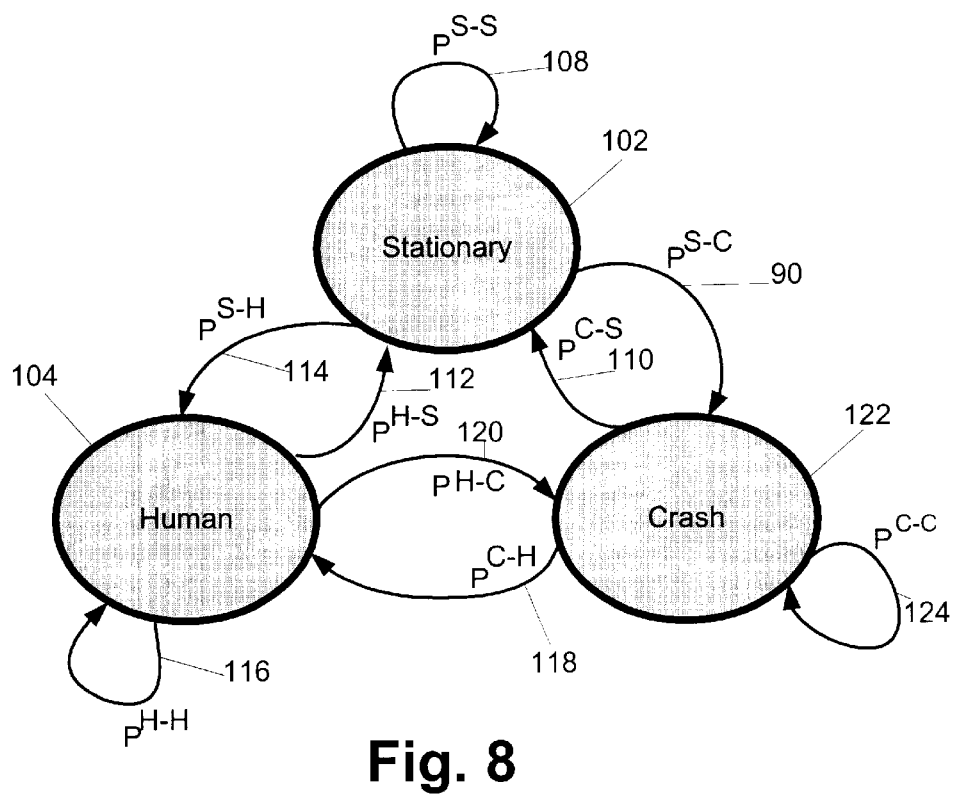
FIG. 8 shows a markov chain of probabilities relating to a three motion mode embodiment including of human, stationary, and crash modes.

FIG. 8 illustrates a similar Markov chain to represent the relevant probabilities relating to motion modes. The preferred embodiment of the invention uses three motion modes: stationary 102, represents a human occupant 18 in a mode of stillness, such as while asleep; human 112, represents a occupant 18 behaving as a typical passenger in an automobile or other vehicle, one that is moving as a matter of course, but not in an extreme way; and crash 122, represents the occupant 18 of a vehicle that is in a mode of crashing.

The probability of an occupant being in a particular state and then ending in a particular state can be identified by lines originating in the current state with arrows pointing to the new state. For example, the probability of an occupant in a stationary state remaining in stationary state $P^{S-S}$ is represented by the arrow at 108. The probability of moving from stationary to human $P^{S-H}$ is represented by the arrow 114 and the probability of moving from stationary to crash $P^{S-C}$ is 90. The total probabilities resulting from an initial state of stationary 102 must add up to 1.

$$P^{S-S}+P^{S-H}+P^{S-C}=1.0 \qquad \text{Equation 11}$$

Similarly, the probability of human to human is $P^{H-H}$ at 116, human to stationary is $P^{H-S}$ at 112, human to crash is $P^{H-C}$ at 120, and stationary to crash $P^{H-C}$ is 90. The total probabilities resulting from an initial state of stationary 102 must add up to 1.

$$P^{H-H}+P^{H-C}+P^{H-S}=1.0 \qquad \text{Equation 12}$$

Lastly, the probability of going from crash to crash is $P^{C-C}$ at 124, crash to stationary is $P^{C-S}$ at 110, and crash to human is $P^{C-H}$ at 118. The total probabilities resulting from an initial state of crash 122 must add up to 1.

$$P^{C-C}+P^{C-S}+P^{C-H}=1.0 \qquad \text{Equation 13}$$

As a practical matter, it is highly unlikely (but not impossible) for an occupant 18 to ever leave the state of crash at 122 once that state has been entered. Under most scenarios, a crash at 122 ends the trip for the occupant 18. Thus, in a preferred embodiment, $P^{C-H}$ is set to nearly zero and $P^{C-S}$ is also set to nearly zero. It is desirable that the system 16 allow some chance of leaving a crash state 122 or else the system 16 may get stuck in a crash state 122 in cases of momentary system 16 "noise" conditions or some other unusual phenomenon. Alternative embodiments can set $P^{C-H}$ and $P^{C-S}$ to any desirable value, including zero, or a probability substantially greater than zero. The three equations for motion mode probabilities in a preferred embodiment are as follows:

$$P^{C-C}+P^{C-H}+P^{C-S}=1.0 \qquad \text{Equation 14}$$

$$P^{H-H}+P^{H-C}+P^{H-S}=1.0 \qquad \text{Equation 15}$$

$$P^{S-C}+P^{S-H}+P^{S-S}=1.0 \qquad \text{Equation 16}$$

The transition probabilities associated with the various shape states and motion modes are used to generate a Kalman filter equation for each combination of characteristic and state. The results of those filters can then be aggregated in to one result, using the various probabilities to give the appropriate weight to each Kalman filter. All of the probabilities are predefined by the user of the invention.

The markov chain probabilities provide a means to weigh the various Kalman filters for each characteristic and for each state and each mode. The tracking and predicting subsystem system 46 incorporates the markov chain probabilities in the form of two subsystems, the shape tracker and predictor 48 and the motion tracker and predictor 50.

F. Shape Tracker And Predictor

Figures 9, 10:
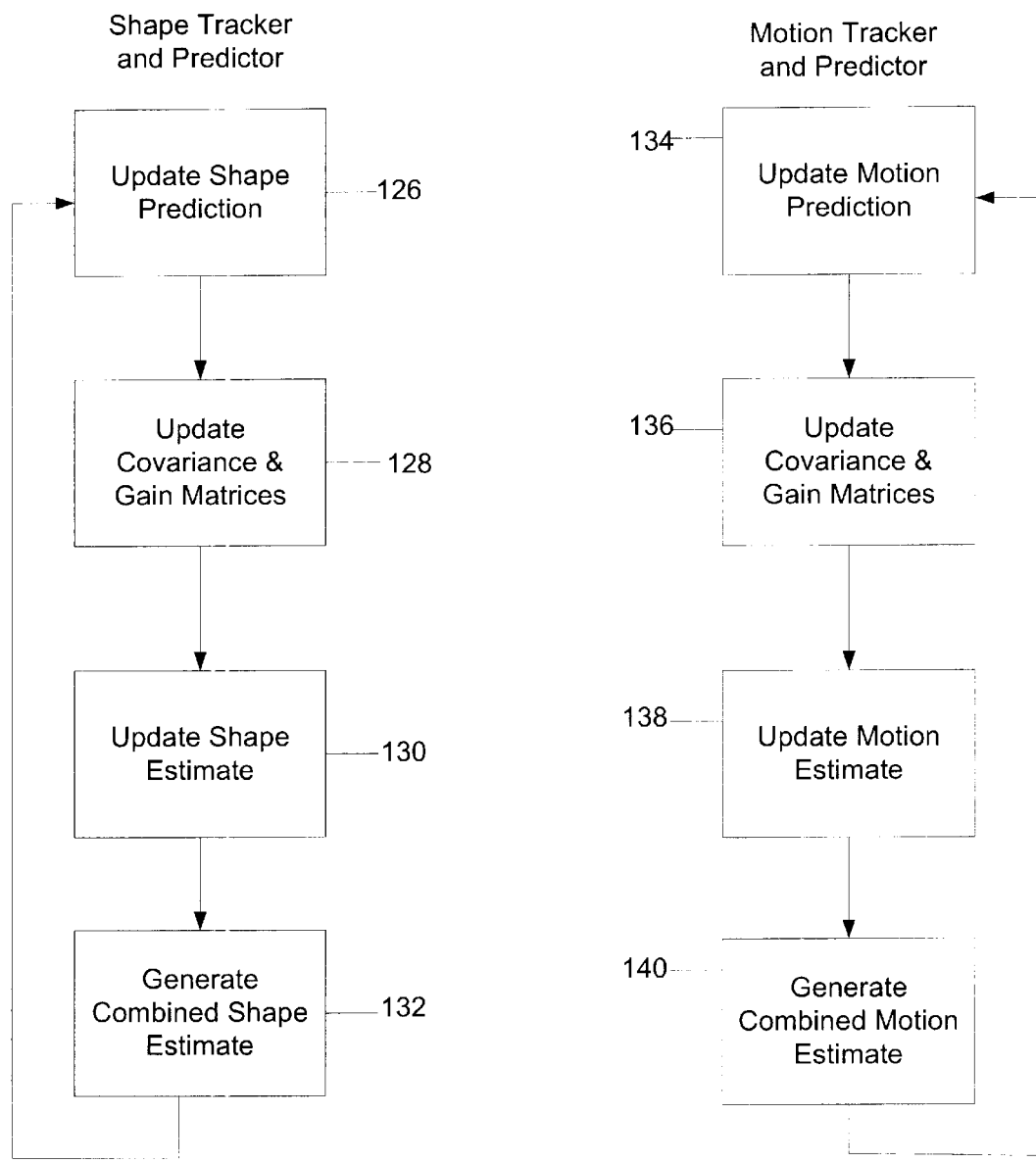
FIG. 9 shows a detailed flowchart for determining the shape of the occupant.
FIG. 10 shows a detailed flowchart for determining the motion of the occupant.

FIG. 9 discloses a detailed flow chart for the shape tracker and predictor 48. In the preferred embodiment of the invention, the shape tracker and predictor 48 tracks and predicts the major axis of the upper ellipse ("major"), the minor axis of the upper ellipse ("minor"), and the y-coordinate of the centroid ("height"). Each characteristic has a vector describing position, velocity, and acceleration information for the particular characteristic. The major vector is [major, major', major"], with major' representing the rate of change in the major or velocity and major" representing the rate of change in major velocity or acceleration. Accordingly, the minor vector is [minor, minor', minor"], and the height vector is [height, height', height"]. Any other shape vectors will similarly have position, velocity, and acceleration components. The first step in the shape tracking and prediction process is an update of the shape prediction at 126.

1. Update Shape Prediction

An update shape prediction process is performed at 126. This process takes the last shape estimate and extrapolates that estimate into a future prediction using a transition matrix.

$$\text{Updated Vector Prediction=Transition Matrix*Last Vector Estimate} \qquad \text{Equation 17}$$

The transition matrix applies Newtonian mechanics to the last vector estimate, projecting forward a prediction of where the occupant 18 will be on the basis of its past position, velocity, and acceleration. The last vector estimate is produced at 130 as described below. The process from 126 to 128, from 128 to 130, and from 130 to 132, loops back to 126. The process at 126 requires that an estimate be previously generated at 130, so processing at 126 and 128 is not invoked the first time through the repeating loop that is steps 126 through 132.

The following equation is then applied for all shape variables and for all shape states, where x is the shape variable, $\Delta t$ represents change over time (velocity), and $\frac{1}{2}\Delta t^2$ $\Delta t$ represents acceleration.

Equation 18:

$$\text{Updated Vector Prediction} = \begin{pmatrix} 1 & \Delta t & \frac{1}{2}\Delta t^2 \\ 0 & 1 & \Delta t \\ 0 & 0 & 1 \end{pmatrix} * \begin{pmatrix} x \\ x' \\ x'' \end{pmatrix}$$

In a preferred embodiment of the invention, there are nine updated vector predictions at 134 because there are three shape states and three non-derived shape variables in the preferred embodiment, and 3×3=9. The updated shape vector predictions are:

Updated major for center state.
Updated major for right state.
Updated major for left state.
Updated minor for center state.
Updated minor for right state.
Updated minor for left state.
Updated height for center state.
Updated height for right state.
Updated height for left state.

2. Update Covariance and Gain Matrices

After the shape predictions are updated for all variables and all states at 126, the shape prediction covariance matrices, shape gain matrices, and shape estimate covariance matrices must be updated at 128. The shape prediction covariance accounts for error in the prediction process. The gain, as described above, represents the weight that the most recent measurement is to receive and accounts for errors in the measurement segmentation process. The shape estimate covariance accounts for error in the estimation process.

The prediction covariance is updated first. The equation to be used to update each shape prediction covariance matrix is as follows:

Equation 19:

$$\text{Shape Prediction Covariance Matrix} = \begin{array}{c} \text{[State Transition Matrix * Old} \\ \text{Estimate Covariance Matrix *} \\ \text{transpose(State Transition Matrix)] +} \\ \text{System Noise} \end{array}$$

The state transition matrix is the matrix that embodies Newtonian mechanics used above to update the shape prediction. The old estimate covariance matrix is generated from the previous loop at 130. On the first loop from 126 through 132, step 128 is skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting noise constants are known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely solely on the past estimate instead. The role played by gain is evidenced in the basic Kalman filter equation of Equation 1.

$X_{(new\ estimate)} = X_{(old\ estimate)} + \text{Gain}[-X_{(old\ estimate)} + X_{(measured)}]$ The gain is not simply one number because one gain exists for each combination of shape variable and shape state. The general equation for updating the gain is Equation 20:

$$\text{Gain} = \frac{\text{Shape Prediction Covariance Matrix} * \text{transpose(Measure Matrix)} *}{inv(\text{Residue Covariance})}$$

The shape covariance matrix is calculated above. The measure matrix is simply a way of isolating and extracting the position component of a shape vector while ignoring the velocity and acceleration components for the purposes of determining the gain. The transpose of the measure matrix is simply [1 0 0]. The reason for isolating the position component of a shape variable is because velocity and acceleration are actually derived components, only position can be measured by a snapshot. Gain is concerned with the weight that should be attributed to the actual measurement.

In the general representation of a Kalman filter, $X_{(new\ estimate)} = X_{(old\ estimate)} + \text{Gain}[-X_{(old\ estimate)} + X_{(measured)}]$, the residue represents the difference between the old estimate and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is Equation 21:

$$\text{Residue Covariance} = \frac{[\text{Measurement Matrix} * \text{Prediction Covariance} *}{\text{transpose(Measurement Matrix)}] + \text{Measurement Noise}}$$

The measurement matrix is a simple matrix used to isolate the position component of a shape vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 22 and the segmentation process 40.

The last matrix to be updated is the shape estimate covariance matrix, which represents estimation error. As estimations are based on current measurements and past predictions, the estimate error will generally be less substantial than prediction error. The equation for updating the shape estimation covariance matrix is Equation 22:

$$\text{Shape Estimate Covariance Matrix} = \frac{(\text{Identity Matrix} - \text{Gain Matrix} *}{\text{Measurement Matrix}) * \text{Shape Predictor Covariance Matrix}}$$

An identity matrix is known in the art, and consists merely of a diagonal line of 1's going from top left to bottom right, with zeros at every other location. The gain matrix is computed and described above. The measure matrix is also described above, and is used to isolate the position component of a shape vector from the velocity and acceleration components. The predictor covariance matrix is also computed and described above.

3. Update Shape Estimate

An update shape estimate process is invoked at 138. The first step in this process is to compute the residue.

Residue=Measurement−(Measurement Matrix*Prediction Covariance)     Equation 23

Then the shape states themselves are updated.

Updated Shape Vector Estimate=Shape Vector Prediction+(Gain*Residue)     Equation 24

When broken down into individual equations, the results are as follows:

$X^C_{(major\ at\ t)} = X^C_{(major\ at\ t)} + \text{Gain}[-X^C_{(major\ at\ t-1)} + X^C_{(measured\ major)}]$ $X^L_{(major\ at\ t)} = X^L_{(major\ at\ t)} + \text{Gain}[-X^L_{(major\ at\ t-1)} + X^L_{(measured\ major)}]$ $X^R_{(major\ at\ t)} = X^R_{(major\ at\ t)} + \text{Gain}[-X^R_{(major\ at\ t-1)} + X^R_{(measured\ major)}]$ $X^C_{(minor\ at\ t)} = X^C_{(minor\ at\ t)} + \text{Gain}[-X^C_{(minor\ at\ t-1)} + X^C_{(measured\ minor)}]$ $X^L_{(minor\ at\ t)} = X^L_{(major\ at\ t)} + \text{Gain}[-X^L_{(minor\ at\ t-1)} + X^L_{(measured\ minor)}]$ $X^R_{(minor\ at\ t)} = X^R_{(minor\ at\ t)} + \text{Gain}[-X^R_{(minor\ at\ t-1)} + X^R_{(measured\ minor)}]$ $X^C_{(height\ at\ t)} = X^C_{(height\ at\ t)} + \text{Gain}[-X^C_{(height\ at\ t-1)} + X^C_{(measured\ height)}]$ $X^L_{(height\ at\ t)} = X^L_{(height\ at\ t)} + \text{Gain}[-X^L_{(height\ at\ t-1)} + X^L_{(measured\ height)}]$ $X^R_{(height\ at\ t)} = X^R_{(height\ at\ t)} + \text{Gain}[-X^R_{(height\ at\ t-1)} + X^R_{(measured\ height)}]$ In the preferred embodiment, C represents the state of center, L represents the state of leaning left towards the driver, and R represents the state of leaning right away from the driver.

4. Generate Combined Shape Estimate

The last step in the repeating loop between steps 126 and steps 132 is a generate combined shape estimate step at 132. The first part of that process is to assign a probability to each shape vector estimate. The residue covariance is re-calculated, using the same formula as discussed above.

Equation 25:

$$\text{Covariance Residue Matrix} = \frac{[\text{Measurement Matrix} * \text{Prediction Covariance Matrix} *}{\text{transpose(Measurement Matrix)}] + \text{Measurement Noise}}$$

Next, the actual likelihood for each shape vector is calculated. The system 16 determines which state the occupant is in by comparing the predicted values for the various states with the recent best estimate of what the current values for the shape variables actually are.

Equation 26:

$$\text{Likelihood}\begin{pmatrix} C \\ R \\ L \end{pmatrix} = e^{-(residue-offset)^2/2\sigma^2}$$

There is no offset in the preferred embodiment of the invention because it is assumed that offsets cancel each other out in the processing performed by the system 16. Sigma represents variance, and is defined in the implementation phase of the invention by a human developer. It is known in the art how to assign a useful value for sigma by looking at data.

The state with the highest likelihood determines the sideways tilt angle Φ. If the occupant 18 is in a centered state, the sideways tilt angle is 0 degrees. If the occupant 18 is tilting left, then the sideways tilt angle is $-\Phi$. If the occupant 18 is tilting towards the right, the sideways tilt angle is $\Phi$. In the preferred embodiment of the invention, $\Phi$ and $-\Phi$ are predefined on the basis of the type and model of vehicle using the system 16.

Next, state probabilities are updated from the likelihood generated above and the pre-defined markovian mode probabilities discussed above.

$$P^C = P^{C-C} + P^{R-C} + P^{L-C} \quad \text{Equation 27}$$

$$P^R = P^{R-R} + P^{C-R} \quad \text{Equation 28}$$

$$P^L = P^{L-L} + P^{C-L} \quad \text{Equation 29}$$

The equations for the updated mode probabilities are as follows, where L represents the likelihood of a particular mode as calculated above:

Equation 30:

$$\text{Probability of mode Left} = \frac{1/[L^L*(P^{L-L}+P^{C-L})+L^R*(P^{R-R}+P^{C-R})+L^C*(P^{C-C}+P^{R-C}+P^{L-C})]*}{L^L*(P^{L-L}+P^{C-L})}$$

Equation 31:

$$\text{Probability of mode Right} = \frac{1/[L^L*(P^{L-L}+P^{C-L})+L^R*(P^{R-R}+P^{C-R})+L^C*(P^{C-C}+P^{R-C}+P^{L-C})]*}{L^R*(P^{R-R}+P^{C-R})}$$

Equation 32:

$$\text{Probability of mode Center} = \frac{1/[L^L*(P^{L-L}+P^{C-L})+L^R*(P^{R-R}+P^{C-R})+L^C*(P^{C-C}+P^{R-C}+P^{L-C})]*}{L^C*(P^{C-C}+P^{R-C}+P^{L-C})}$$

The combined shape estimate is ultimately calculated by using each of the above probabilities, in conjunction with the various shape vector estimates.

Equation 33:

$$X = \text{Probability of mode Left} * X^{Left} +$$
$$\text{Probability of mode Right} * X^{Right} +$$
$$\text{Probability of mode Center} * X^{Center}$$

X is any of the shape variables, including a velocity or acceleration derivation of a measure value.

The loop from 126 through 132 repeats continuously while the vehicle is in operation or while there is an occupant 18 in the seat 20. The process at 126 requires that an estimate be previously generated at 130, so processing at 134 and 136 is not invoked the first time through the repeating loop that is steps 136–132.

G. Motion Tracker and Predictor

The motion tracker and predictor 50 in FIG. 10 functions similarly in many respects, to the shape tracker and predictor 48 in FIG. 9. The motion tracker and predictor 50 tracks different characteristics and vectors than the shape tracker. In the preferred embodiment of the invention, the x-coordinate of the centroid and the forward tilt angle $\theta$ ("$\theta$"), and their corresponding velocities and accelerations (collectively "motion variables") are tracked and predicted. The x-coordinate of the centroid is used to determine the distance between the occupant 18 and a location within the automobile such as the instrument panel 34, the airbag deployment system 36, or some other location in the automobile. In the preferred embodiment, the instrument panel 34 is used since that is where the airbag is generally deployed from.

The x-coordinate vector includes a position component (x), a velocity component (x'), and an acceleration component (x"). The $\theta$ vector similarly includes a position component ($\theta$), a velocity component ($\theta$'), and an acceleration component ($\theta$"). Any other motion vectors will similarly have position, velocity, and acceleration components.

1. Update Motion Prediction

An update motion prediction process is performed at 134. This process takes the last motion estimate and extrapolates that estimate into a future prediction using a transition matrix as disclosed in Equation 17:.

Updated Vector Prediction=Transition Matrix*Last Vector Estimate

The transition matrix applies Newtonian mechanics to the last vector estimate, projecting forward a prediction of where the occupant 18 will be on the basis of its past position, velocity, and acceleration. The last vector estimate is produced at 138 as described below. The process from 134 to 136, from 136 to 138, and from 138 to 140, loops back to 134. The process at 134 requires that an estimate be previously generated at 138, so processing at 134 and 136 is not invoked the first time through the repeating loop that is steps 134–140.

Equation 18 is then applied for all motion variables and for all motion modes:

$$\text{Updated Vector Prediction} = \begin{pmatrix} 1 & \Delta t & \frac{1}{2}\Delta t^2 \\ 0 & 1 & \Delta t \\ 0 & 0 & 1 \end{pmatrix} * \begin{pmatrix} x \\ x' \\ x'' \end{pmatrix}$$

In the preferred embodiment of the invention, there would be six updated vector predictions at 134 because there are three motion modes and two motion variables in the preferred embodiment, and 3×2=6. The updated motion predictions are:

Updated x-coordinate for crash mode.

Updated x-coordinate for human mode.

Updated x-coordinate for stationary mode.

Updated $\theta$ for crash mode.

Updated $\theta$ for human mode.

Updated $\theta$ for stationary mode.

2. Update Covariance and Gain Matrices

After the motion predictions are updated for all motion variables and all modes at 134, the motion prediction covariance matrices, motion gain matrices, and motion estimate covariance matrices must be updated at 136. The motion prediction covariance accounts for error in the prediction process. The gain, as described above, represents the weight that the most recent measurement is to receive and accounts for errors in the measurement and segmentation process. The motion estimate covariance accounts for error in the estimation process.

The prediction covariance is updated first. Equation 34 is used to update each motion prediction covariance matrix.

Equation 34:

$$\text{Motion Prediction Covariance Matrix} = \frac{\text{State Transition Matrix} * \text{Old Estimate Covariance Matrix} * \text{transpose(State Transition Matrix)} +}{\text{System Noise}}$$

The state transition matrix is the matrix that embodies Newtonian mechanics used above to update the motion prediction. The old estimate covariance matrix is generated from the previous loop at 136. On the first loop from 134 through 140, step 134 is skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting such constants are known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely on the past estimate instead. The role played by gain is evidenced in the basic Kalman filter equation in Equation 1 where $$X_{(new\ estimate)} = X_{(old\ estimate)} + \text{Gain}[-X_{(old\ estimate)} + X_{(measured)}]$$

The gain is not simply one number but an entire matrix because one gain exists for each combination of motion variable and motion mode. The general equation for updating the gain is Equation 35:

$$\text{Gain} = \frac{\text{Motion Prediction Covariance Matrix} * \text{transpose(Measure Matrix)} *}{inv(\text{Residue Covariance})}$$

The motion covariance matrix is calculated above. The measure matrix is simply a way of isolating and extracting the position component of a motion vector while ignoring the velocity and acceleration components for the purposes of determining the gain. The transpose of the measure matrix is simply [1 0 0]. The reason for isolating the position component of a motion variable is because velocity and acceleration are actually derived components. Position is the only component actually measured, and because gain is concerned with the weight that should be attributed to the actual measurement, derived variables should be isolated.

In the general representation of a Kalman filter, $X_{(new\ estimate)} = X_{(old\ estimate)} + \text{Gain}[-X_{(old\ estimate)} + X_{(measured)}]$, the residue represents the difference between the old estimate and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is Equation 21 as disclosed above:

$$\text{Residue Covariance} = \frac{[\text{Measurement Matrix} * \text{Prediction Covariance} * \text{transpose(Measurement Matrix)}] +}{\text{Measurement Noise}}$$

The measurement matrix is a simple matrix used to isolate the position component of a motion vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 22 and the segmentation process 40.

The last matrix to be updated is the motion estimate covariance matrix, which represents estimation error. As estimations are based on current measurements and past predictions, the estimate error will generally be less substantial than the prediction error. The equation for updating the motion estimation covariance matrix is Equation 36:

$$\text{Motion Estimate Covariance Matrix} = \frac{(\text{Identity Matrix} - \text{Gain Matrix} * \text{Measurement Matrix}) *}{\text{Motion Predictor Covariance Matrix}}$$

An identity matrix is known in the art, and consists merely of a diagonal line of 1's going from top left to bottom right, with zeros at every other location. The gain matrix is computed and described above. The measure matrix is also described above, and is used to isolate the position component of a motion vector from the velocity and acceleration components. The predictor covariance matrix is also computed and described above.

3. Update Motion Estimate

An update motion estimate process is invoked at 138. The first step in this process is to compute the residue using Equation 23:

$$\text{Residue} = (\text{Measurement Matrix} * \text{Prediction Covariance})$$

Then the motion states themselves are updated.

Motion Vector Estimate=Motion Vector Prediction+ (Gain*Residue)  Equation 37

When broken down into individual equations, the results are as follows:

$$X^H_{(x\text{-}coordinate\ at\ t)} = X^H_{(x\text{-}coordinate\ at\ t)} + \text{Gain}[-X^H_{(x\text{-}coordinate\ at\ t-1)} + X^H_{(measured\ x\text{-}coordinate)}]$$

$$X^S_{(x\text{-}coordinate\ at\ t)} = X^S_{(x\text{-}coordinate\ at\ t)} + \text{Gain}[-X^S_{(x\text{-}coordinate\ at\ t-1)} + X^S_{(measured\ x\text{-}coordinate)}]$$

$$X^C_{(x\text{-}coordinate\ at\ t)} = X^C_{(x\text{-}coordinate\ at\ t)} + \text{Gain}[-X^C_{(x\text{-}coordinate\ at\ t-1)} + X^C_{(measured\ x\text{-}coordinate)}]$$

$$X^H_{(\theta\ at\ t)} = X^H_{(\theta\ at\ t)} + \text{Gain}[-X^H_{(\theta\ at\ t-1)} + X^H_{(measured\ \theta)}]$$

$$X^S_{(\theta\ at\ t)} = X^S_{(\theta\ at\ t)} + \text{Gain}[-X^S_{(\theta\ at\ t-1)} + X^S_{(measured\ \theta)}]$$

$$X^C_{(\theta\ at\ t)} = X^C_{(\theta\ at\ t-1)} + \text{Gain}[-X^C_{(\theta\ at\ t-1)} + X^C_{(measured\ \theta)}]$$

In the preferred embodiment, H represents the mode of human, C represents the mode of crash, and S represents the mode of stationary.

4. Generate Combined Motion Estimate

The last step in the repeating loop between steps 134 and steps 140 is a generate combined motion estimate step at 140. The first part of that process is to assign a probability to each motion vector estimate. The residue covariance is re-calculated, using Equation 25 as discussed above.

$$\text{Covariance Residue Matrix} = \begin{bmatrix} \text{Measurement Matrix} * \\ \text{Prediction Covariance Matrix} * \\ \text{transpose(Measurement Matrix)} \end{bmatrix} + \text{Measurement Noise}$$

Next, the actual likelihood for each motion vector is calculated.

Equation 38:

$$\text{Likelihood}\begin{pmatrix} C \\ H \\ S \end{pmatrix} = e^{-(residue-offset)^2/2\sigma^2}$$

There is no offset in a preferred embodiment of the invention because it can be assumed that offsets cancel each other out, and that the system's 16 processes can be zero-mean Gaussian signals. Sigma represents variance, is defined in the implementation phase of the invention by a human developer. It is known in the art how to assign a useful value for sigma by looking at data.

Next, mode probabilities are updated from the likelihood generated above and the pre-defined markovian mode probabilities discussed above.

$$P^C = P^{C-C} + P^{S-C} + P^{H-C} \quad \text{Equation 39}$$

$$P^H = P^{H-H} + P^{S-H} + P^{C-H} \quad \text{Equation 40}$$

$$P^S = P^{S-S} + P^{H-S} + P^{C-S} \quad \text{Equation 41}$$

The equations for the updated mode probabilities are as follows, where L represents the likelihood of a particular mode as calculated above:

Equation 42:

$$\text{Probability of mode Stationary} = \frac{1/[L^S*(P^{S-S}+P^{H-S}+P^{C-S})+L^H*(P^{H-H}+P^{S-H}+P^{C-H})+L^C*(P^{C-C}+P^{S-C}+P^{H-C})]*L^S*(P^{S-S}+P^{H-S}+P^{C-S})}{}$$

Equation 43:

$$\text{Probability of mode Human} = \frac{1/[L^S*(P^{S-S}+P^{H-S}+P^{C-S})+L^H*(P^{H-H}+P^{S-H}+P^{C-H})+L^C*(P^{C-C}+P^{S-C}+P^{H-C})]*L^H*(P^{H-H}+P^{S-H}+P^{C-H})}{}$$

Equation 44:

$$\text{Probability of mode Crash} = \frac{1/[L^S*(P^{S-S}+P^{H-S}+P^{C-S})+L^H*(P^{H-H}+P^{S-H}+P^{C-H})+L^C*(P^{C-C}+P^{S-C}+P^{H-C})]*L^C*(P^{C-C}+P^{S-C}+P^{H-C})}{}$$

The combined motion estimate is ultimately calculated by using each of the above probabilities, in conjunction with the various motion vector estimates.

Equation 45:

$$X = \text{Probability of mode Human} * X^{Human} + \\ \text{Probability of mode Crash} * X^{Crash} + \\ \text{Probability of mode Stationary} * X^{Stationary}$$

X is any of the motion variables, including a velocity or acceleration derivation.

The loop from 126 through 132 repeats continuously while the vehicle is in operation or while there is an occupant 18 in the seat 20.

H. Impact Assessment Subsystem

The impact assessment subsystem 52 uses the shape and motion variables above to generate a impact metric representing the occupant 18 impact that an airbag needs to absorb. In a preferred embodiment, kinetic energy is the impact metric. In alternative embodiments, momentum, or a weighted combination of kinetic energy and momentum can be used as the impact metric. Alternative embodiments can utilize any impact metric incorporating the characteristics of mass, velocity, or any of the other motion or shape variables, including any characteristics that could be derived from a motion or shape variable.

1. Mass

As disclosed in Equation 4, mass is used to compute the impact metric. The density of a human occupant 18 is relatively constant across broad spectrum of potential human occupants 18. The average density of a human occupant 18 is known in the art as anthropomorphic data that can be obtained from NHTSA (National Highway Traffic Safety Administration) or the IIA (Insurance Institute of America). The mass of an occupant 18 is substantially a function of volume.

$$\text{Mass} = \text{Volume} * \text{Density} \quad \text{Equation 46}$$

In a preferred embodiment, the system 16 determines whether or not the occupant 18 is restrained by a seat belt. This is done in by comparing the velocity (x') of the occupant 18 with the rate of change in the forward tilt angle (θ'). If the occupant is restrained by a seat belt, the rate of change in the forward tilt angle should be roughly two times the velocity of the occupant. In contrast, for an unbelted occupant, the ratio of θ'/x' will be roughly zero, because there will be an insignificant change in the forward tilt angle for an unbelted occupant. If an occupant 18 is restrained by a functional seatbelt, the mass of the occupant's 18 lower torso should not be included in the impact metric of the occupant 18 because the mass of the lower torso is restrained by a seal belt, and thus will not need to be constrained by the airbag deployment system 36. If the occupant 18 is not restrained by a seatbelt, the mass of the lower torso needs to be included in the mass of the occupant 18. Across the broad spectrum of potential human occupants 18, the upper torso is consistently between 65% and 68% of the total mass of a human occupant 18. If the occupant 18 is not restrained by a seat belt in a preferred embodiment, the mass of both the occupant 18 (including the lower torso) is calculated by taking the mass of the upper torso and dividing that mass by a number between 0.65 and 0.68. A preferred embodiment does not require the direct calculation of the volume or mass of the lower ellipse 56.

The volume of an ellipsoid is well known in the art.

$$\text{Volume} = 4/3 * \pi * \text{major} * \text{minor}_1 * \text{minor}_2 \qquad \text{Equation 47}$$

Major is the major axis 64. Minor$_1$ is the minor axis 66. Minor$_2$ is the minor axis that is not visible in FIG. 5 because it is in the z-axis of FIG. 5, and represents the "width" of the ellipsoid, or the shoulder-span of the occupant 18. The 2-D ellipse is known to be a projection from a particular angle and therefore allows the system 16 to decide what the originating 3-D Ellipsoid should be. In a preferred embodiment, the "width" of the ellipsoid is capped at the width of the vehicle seat 20 in which the occupant 18 sits. The width of the vehicle seat 20 can be easily measured for any vehicle before the system 16 is used for a particular vehicle model or type.

Minor$_2$ is derived from the major axis 64 and the minor axis 66. Anthropomorphic data from NHTSA or the Insurance Institute of America is used to create electronic "look-up" tables deriving the z-axis information from the major axis 64 and minor axis 66 values. FIG. 11a illustrates the format of a "look-up" table that could be electronically stored in the computer 30. The inputs of a major axis value 64 and a minor axis value 66 are used to derive the z-axis value, which can then be used to calculate volume using Equation 47, and then mass using Equation 46.

FIG. 11b illustrates a "look-up" table where Equation 47 is incorporated directly into output listing. Inputting the major 64 and minor 66 axis values results in the output of volume rather than merely the z-axis value because the operations of Equation 47 are already performed on the z-axis value.

FIG. 11c illustrates a preferred embodiment of the "look-up" table where both Equations 47 and 48 are incorporated into the output column, and thus the system inputs the major 64 and minor 66 axis values, while outputting the mass of the occupant 18.

2. Velocity

Velocity is a motion characteristic derived from the differences in occupant 18 position as described by Newtonian mechanics and is described in greater detail above. The relevant measure of occupant 18 velocity is the moment of impact between the occupant 18 and the airbag. The movement of the airbag towards the occupant 18 is factored into this analysis in the preferred embodiment of the system 16.

$$\int \text{Velocity}_{occupant} \delta t = \int \text{Velocity}_{airbag} \delta t \qquad \text{Equation 49}$$

3. Additional Alternative Variations and Embodiments

The underlying calculations of motion and shape variables are updated very quickly using the outputted state transition matrix which allows the system 16 to predict the position and shape in advance, and at a rate more quickly than the rate in which the sensor 22 collects data. The impact metric prediction is thus similarly updated at a quicker rate than the rate in which the sensor 22 collects data. In alternative embodiments of the invention that classify the occupant 18 into different occupant types, each occupant type could have a distinct density.

Other characteristics such as momentum can be substituted for kinetic energy as a proxy for the desirable strength of an airbag deployment. Other potential impact metrics include momentum, a weighted combination of momentum and kinetic energy, or potentially any other metric utilizing mass or velocity. Regardless of the particular impact metric used, the impact metric should be updated at a quicker rate than the rate in which the sensor 22 collects data to avoid the need for using an expensive high-speed camera.

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

What is claimed is:

1. An image processing system for use with an airbag deployment system having a seat, an occupant in the seat, a sensor for generating sensor readings, an airbag, and an airbag controller, said image processing system comprising:

a tracking and predicting subsystem, including a sensor reading and an occupant characteristic, said tracking and predicting subsystem generating said occupant characteristic from said sensor reading; and an impact assessment subsystem, including a impact metric, said impact assessment subsystem generating said impact metric from said occupant characteristic.

2. An image processing system as recited in claim 1, wherein a kinetic energy prediction is said impact metric.

3. An image processing system as recited in claim 1, wherein said impact metric relates to a point in time when the occupant impacts into the deploying airbag.

4. An image processing system as recited in claim 1, wherein said impact metric is generated at a quicker rate than the rate at which the sensor generates said sensor readings.

5. An image processing system as recited in claim 1, further comprising an ellipse fitting subsystem and an ellipse, said ellipse fitting subsystem generating said ellipse to represent the occupant.

6. An image processing system as recited in claim 1, wherein said tracking and predicting subsystem is an iterative tracking and predicting subsystem.

7. An image processing system as recited in claim 6, said iterative tracking and predicting subsystem including a plurality of Kalman filters, wherein said Kalman filters generate said impact metric.

8. An image processing system as recited in claim 1, wherein said impact metric determines the deployment strength of the airbag.

9. An image processing system as recited in claim 1, said impact assessment subsystem including a seat belt status.

10. An image processing system as recited in claim 1, further including a plurality of occupant characteristics comprising:

a velocity; and one said occupant characteristic selected from the group including a mass;

a volume;

an area; and an axis of a three-dimensional environment.

11. An image processing system as in claim 1, said tracking and predicting subsystem further including:

a plurality of occupant characteristics, comprising shape characteristics and motion characteristics;

a motion tracker and predictor for tracking and predicting said motion characteristics; and a shape tracker and predictor for tracking and predicting said shape characteristics;

wherein said impact metric is based on at least one said motion characteristic and at least one said shape characteristic.

12. An image processing system as in claim 11, wherein said shape characteristics include:
   a height of the occupant; and
   a shape of the upper torso of the occupant.

13. An image processing system as in claim 11, wherein said motion characteristics include:
   a distance between the occupant and the airbag; and
   a forward tilt angle.

14. An image processing system as in claim 11, including a plurality of predefined shape states, wherein said shape tracker and predictor uses said plurality of predefined shape states.

15. An image processing system as in claim 14, wherein said predefined states comprise
   a state of leaning left;
   a state of leaning right; and
   a state of sitting generally centered.

16. An image processing system as in claim 11, including a plurality of predefined motion modes, wherein said motion tracker and predictor utilizes said plurality of predefined motion modes.

17. An image processing system as in claim 16, wherein said predefined motion modes comprise:
   a mode of crashing;
   a mode of being stationary; and
   a mode of being human.

18. An image classification system as in claim 11, wherein said shape tracker and predictor comprises:
   an update shape predictor;
   an update covariance and gain matrices generator;
   an update shape estimator; and
   a combined shape estimate generator.

19. An image classification system as in claim 11, wherein said motion tracker and predictor comprises:
   an update motion predictor;
   an update covariance and gain matrices generator;
   an update motion estimator; and
   a combined motion estimate generator.

20. An image processing system as in claim 11, wherein said shape tracker and predictor determines a sideways tilt angle of the occupant.

21. An image processing system for use with an airbag deployment system having a seat, an occupant in the seat, a sensor for capturing occupant images, an airbag, an airbag controller, said image processing system comprising:
   a segmentation subsystem, including an ambient image and a segmented image, said segmentation subsystem generating said segmented image from said ambient image;
   an ellipse fitting subsystem, including an ellipse, said ellipse fitting subsystem representing said ambient image with said ellipse;
   a tracking and predicting subsystem, including a plurality of occupant characteristics, said tracking an predicting subsystem generating said plurality of occupant characteristics from said ellipse and
   an impact assessment subsystem, including an impact metric, said impact assessment subsystem generating said impact metric from said plurality of occupant characteristics.

22. An image processing system as recited in claim 21, said tracking and predicting subsystem further including a plurality of past predictions, wherein said plurality of past predictions are incorporated into said plurality of occupant characteristics.

23. An image processing system as recited in claim 22, said tracking and predicting subsystem applying a plurality of Kalman filter to incorporate said plurality of past predictions into said plurality of occupant characteristics.

24. A method for determining airbag deployment strength, comprising the steps of:
   applying a plurality of mathematical heuristics to a plurality of image characteristics to incorporate past measurements and past predictions into a plurality of updated occupant characteristic predictions, and
   calculating an impact metric representing the magnitude of the impact between the occupant and the airbag from the updated occupant characteristic predictions.

25. A method for determining airbag deployment strength as recited in claim 24, wherein the plurality of mathematical heuristics are Kalman filters.

26. A method for determining airbag deployment strength as recited in claim 24, wherein the impact metric is the kinetic energy of the occupant.

* * * * *

UNITED STATES PATENT AND TRADEMARK OFFICE
CERTIFICATE OF CORRECTION

PATENT NO. : 6,577,936 B2  Page 1 of 1
DATED : June 10, 2003
INVENTOR(S) : Michael E. Farmer It is certified that error appears in the above-identified patent and that said Letters Patent is hereby corrected as shown below:

Column 20,
Line 18, change "a" to -- an --

Column 22,
Line 13, change "an" to -- and --
Line 15, add -- ; -- after "ellipse"

Signed and Sealed this

Ninth Day of September, 2003

JAMES E. ROGAN
*Director of the United States Patent and Trademark Office*